US012747661B2

(12) United States Patent
Harms et al.

(10) Patent No.: US 12,747,661 B2
(45) Date of Patent: Sep. 29, 2026

(54) LOGGING TOOL INVERSION INTEGRATION

(71) Applicant: Schlumberger Technology Corporation, Sugar Land, TX (US)

(72) Inventors: Kent Harms, Sugar Land, TX (US); Volodymyr Puzyrov, Cambridge, MA (US); Lin Liang, Cambridge, MA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 19/233,497

(22) Filed: Jun. 10, 2025

(65) Prior Publication Data

US 2026/0153022 A1 Jun. 4, 2026

Related U.S. Application Data

(60) Provisional application No. 63/727,230, filed on Dec. 3, 2024.

(51) Int. Cl.

| | |
|---|---|
| ***E21B 44/00*** | (2006.01) |
| ***E21B 7/04*** | (2006.01) |
| ***E21B 47/026*** | (2006.01) |
| ***E21B 49/00*** | (2006.01) |
| ***G05B 13/02*** | (2006.01) |

(52) U.S. Cl.

CPC ................ *E21B 44/00* (2013.01); *E21B 7/04* (2013.01); *E21B 47/026* (2013.01); *E21B 49/00* (2013.01); *G05B 13/0265* (2013.01); *E21B 2200/22* (2020.05)

(58) Field of Classification Search

CPC ......... E21B 2200/22; E21B 44/00; E21B 7/04

See application file for complete search history.

(56) References Cited

U.S. PATENT DOCUMENTS

| | | | | |
|---|---|---|---|---|
| 6,799,117 | B1 * | 9/2004 | Proett | E21B 49/08 702/12 |
| 12,428,946 | B2 * | 9/2025 | Pournazari | E21B 44/02 |
| 12,448,879 | B2 * | 10/2025 | Li | G01V 3/20 |
| 12,481,900 | B2 * | 11/2025 | Keller | G06F 17/18 |
| 2018/0321415 | A1 * | 11/2018 | Thiel | E21B 41/00 |
| 2019/0302310 | A1 * | 10/2019 | Fox | G01V 11/002 |
| 2019/0390542 | A1 * | 12/2019 | Song | E21B 47/022 |

(Continued)

FOREIGN PATENT DOCUMENTS

WO 2024123722 A1 6/2024

*Primary Examiner* — Blake Michener

(74) *Attorney, Agent, or Firm* — Jeffrey D. Frantz

(57) ABSTRACT

A method and system to implement a technique including receiving at least one drilling parameter corresponding to an attribute related to a well in a formation as measured data, performing a first inversion operation (e.g., using machine learning methods) utilizing the measured data to generate first inversion result, determining whether the first inversion result meets a predetermined criteria related to quality of the first inversion result, and performing a geosteering operation based on the first inversion result when the first inversion result is determined to meet the predetermined criteria. If the first inversion result is determined not to meet the predetermined criteria, a second inversion operation (e.g., traditional methods) is used to invert the measured data to generate second inversion result, which is used for performing a geosteering operation.

14 Claims, 3 Drawing Sheets

(56) References Cited

U.S. PATENT DOCUMENTS

| | | | | |
|---|---|---|---|---|
| 2020/0011158 | A1* | 1/2020 | Xu | E21B 49/00 |
| 2022/0090481 | A1* | 3/2022 | Aljedaani | G06N 3/08 |
| 2022/0170359 | A1* | 6/2022 | Boualleg | G06N 20/20 |
| 2024/0247580 | A1* | 7/2024 | Wang | E21B 44/00 |
| 2024/0411041 | A1* | 12/2024 | Kulkarni | G01V 20/00 |
| 2025/0116177 | A1* | 4/2025 | Li | G06N 3/045 |
| 2025/0225411 | A1* | 7/2025 | Gutierrez Gonzalez | E21B 7/04 |
| 2025/0284866 | A1* | 9/2025 | Puzyrov | G06F 30/27 |
| 2025/0382867 | A1* | 12/2025 | Xu | E21B 44/00 |

* cited by examiner

LOGGING TOOL INVERSION INTEGRATION

CROSS-REFERENCE TO RELATED APPLICATIONS

This application claims priority to and benefit of U.S. Provisional Patent Application No. 63/727,230, filed on Dec. 3, 2024, which is incorporated by reference herein in its entirety.

BACKGROUND

The subject matter disclosed herein relates to systems and methods of data analysis, particularly for use with well logging tools and geosteering operations.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Producing hydrocarbons from a wellbore drilled into a geological region is a remarkably complex endeavor. In many cases, decisions involved in hydrocarbon exploration and production may be informed by measurements from downhole well-logging tools that are conveyed deep into the wellbore. The measurements may be used to infer properties or characteristics of the geological region surrounding the wellbore.

Well logging tools, such as downhole tools, are utilized to measure well properties for well evaluation. These logging tools can include, for example, electromagnetic logging tools. The logging tools are typically utilized in conjunction with logging-while-drilling (LWD) operations or mapping-while-drilling operations in which formation evaluation measurements (e.g., resistivity, porosity, etc.) are taken during drilling operations. These measurements can be useful in providing, for example, bed boundary detection as well as delineation of reservoir boundaries and fluid contacts in a formation.

Measurement data from logging tools can be processed using an inversion method, for example, to determine a position of a wellbore with respect to layer boundaries in earth formations. However, traditional inversion calculation techniques can be complex and costly. Therefore, alternate techniques for processing measurement data from logging tools can utilize machine learning in processing using an inversion method. However, the results, while rapidly generated, can at times lead to erroneous results.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
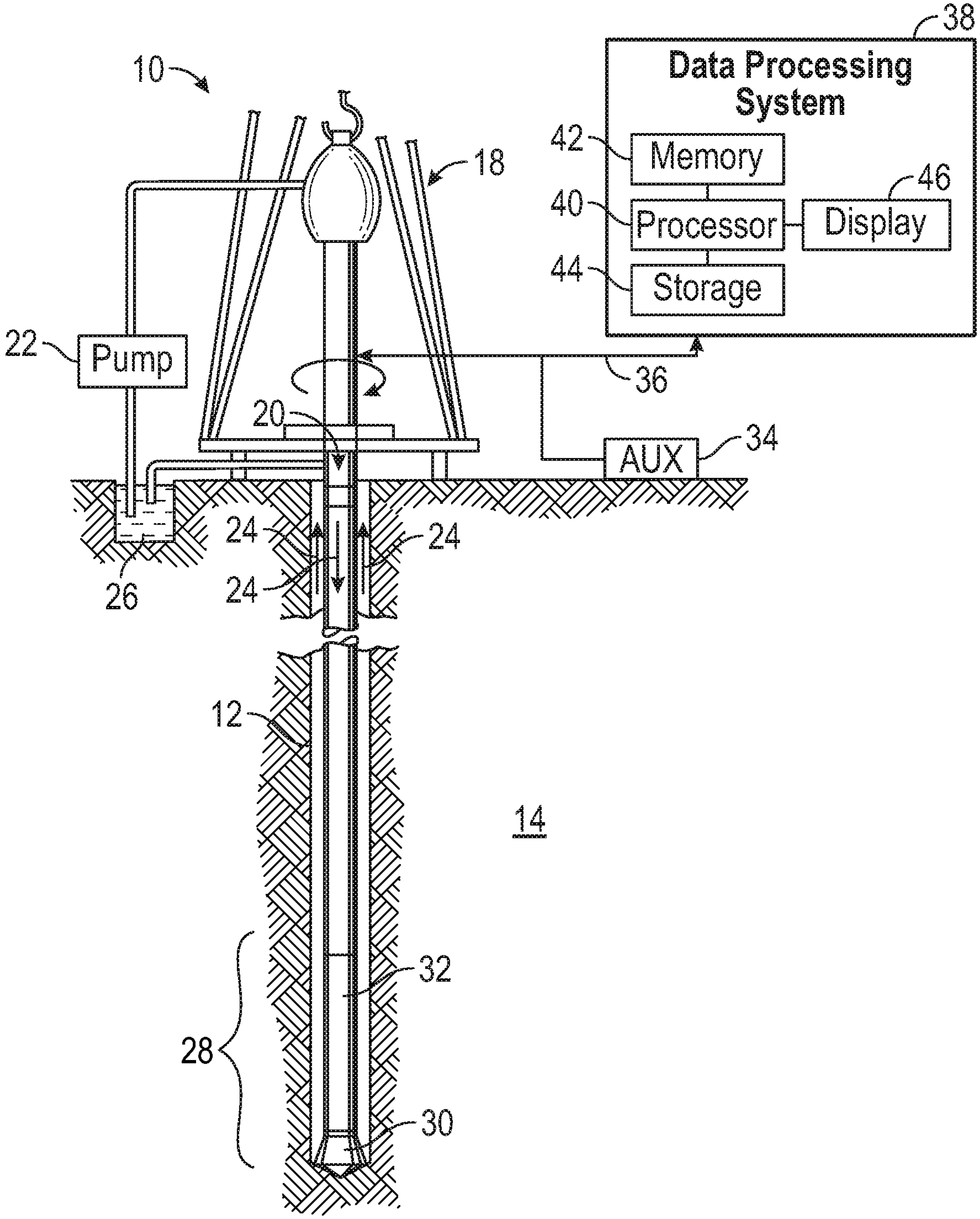
FIG. 1 depicts an example wellsite system for measuring borehole data using various downhole tools and surface tools, in accordance with embodiments of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers'specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Downhole tools, for example, electromagnetic (EM) logging tools have grown more sophisticated. For example, EM logging tools are capable of providing advanced downhole measurements, which produces a large number of measurement logs. These measurements can be used in real-time or in near rear-time to allow for geosteering to occur. For example, measurements (e.g., resistivity measurements) can be made while drilling a wellbore and these measurements can be compared with expected measurement data to generate a formation model. This formation model and, more particularly, the borehole location therein can be utilized to control the direction of drilling.

In this manner, the geosteering process is an interactive approach that combines technology and domain knowledge to deliver optimally placed wellbores as well as to maximize well construction performance through adjustments to a well trajectory in real-time (or in near real-time). As described above, the geosteering process utilizes geological information and measurements taken while drilling to stay within a certain geological target. This technique is often used in horizontal drilling, for example, to maximize the performance of a well by ensuring it remains in the most productive layer of rock. Additionally, the process can be utilized in conjunction with vertical wells, for example, when there is a desire to stop drilling based on a specific geological layer rather than a pre-defined depth.

One technique for the processing of the measurement data taken in conjunction with a geosteering process or operation involves implementing an inversion operation on the measured data, for example, to determine a position of a wellbore with respect to layer boundaries in earth formations. Inversions (inversion operations), thus, can be utilized in geosteering to interpret formation data in real-time while drilling. This allows users to adjust the drilling trajectory to optimize production, reduce risks, etc. In practice, EM logging tools take measurements that are applied to an inversion process that operates to generate a mapping of a reservoir. This mapping, as noted above, can be used in the geosteering process to make informed decisions about the geological formations.

Inversion methods (e.g. utilizing a Gauss-Newton method or the like) can be applied to measured data for evaluating subsurface formation resistivity. While these inversion methods can be highly accurate, they can be costly in terms of both time and computational resources. In other embodiments, machine learning can be applied to generate a trained machine learning (ML) model that operates to apply inversion methods to received data from the EM logging tool. Use of a trained ML model for implementation of the inversion operation can require substantially less computation resources and time than traditional inversion methods (e.g., utilizing a Gauss-Newton method or the like). However, at times, the trained ML model may generate results that have less veracity than those that would be generated by more traditional inversion methods (e.g., utilizing a Gauss-Newton method or the like). Accordingly, in some embodiments, techniques and systems described herein operate to apply use of a trained ML model for implementation of the inversion operation, determination of the veracity of the results of the inversion operation, and switching inversion operations to a more traditional inversion method (e.g., utilizing a Gauss-Newton method or the like) when the veracity of the results of the inversions generated by the trained ML model are deemed not to meet a predetermined criteria, for example, being below a predetermined threshold level, being at or below a predetermined threshold level, being above a predetermined threshold level, being at or above a predetermined threshold level, being within a predetermined range, being outside of a predetermined range, etc. In this manner, advantages with respect to cost and speed of processing can be achieved through the use of a trained ML model for invasion inversion without sacrificing results by switching inversion methods when the trained ML model inversions are determined to be less than optimal by a predetermined amount.

With the foregoing in mind, FIG. 1 illustrates a drilling system 10 that may employ the systems and methods of this disclosure. The drilling system 10 may be used to drill a borehole 12 into a geological region 14. In the drilling system 10, a drilling rig 18 may rotate a drill string 20 within the borehole 12. As the drill string 20 is rotated, a drilling fluid pump 22 may be used to pump drilling fluid, which may be referred to as "mud" or "drilling mud," downward through the center of the drill string 20, and back up around the drill string 20, as shown by reference arrows 24. At the surface, return drilling fluid may be filtered and conveyed back to a mud pit 26 for reuse. The drilling fluid may travel down to the bottom of the drill string 20 known as the bottom-hole assembly (BHA) 28. The drilling fluid may be used to rotate, cool, and/or lubricate a drill bit 30 that may be a part of the BHA 28. The fluid may exit the drill string 20 through the drill bit 30 and carry drill cuttings away from the bottom of the borehole 12 back to the surface.

The BHA 28 may include the drill bit 30 along with various downhole tools, such as one or more logging tools 32. The BHA 28 may thus convey the one or more logging tools 32 through the geological region 14 via the borehole 12. As described in greater detail herein, the one or more logging tools 32 may be any suitable downhole tool that emits electromagnetic waves within the borehole 12 (e.g., a downhole environment). The downhole tools, which may include the one or more logging tools 32, may collect a variety of information relating to the geological region 14 and the state of drilling in the borehole 12. For instance, the downhole tools may be logging-while drilling (LWD) tools that measure physical properties of the geological region 14, such as density, porosity, resistivity, lithology, and so forth. Likewise, the downhole tools may be measurement-while-drilling (MWD) tools that measure certain drilling parameters, such as the temperature, pressure, orientation of the drill bit 30, mapping-while-drilling tools, and so forth.

The one or more logging tools 32 may receive energy from an electrical energy device or an electrical energy storage device, such as an auxiliary power source 34 or another electrical energy source to power the tool. In some embodiments, the one or more logging tools 32 may include a power source within the one or more logging tools 32, such as a battery system or a capacitor, to store sufficient electrical energy to emit and/or receive electromagnetic waves.

Communications 36, such as control signals, may be transmitted from a data processing system 38 (processing system 38) to the one or more logging tools 32, and communications 36, such as data signals related to the results/measurements of the one or more logging tools 32, may be returned to the data processing system 38 from the one or more logging tools 32. The data processing system 38 may be any electronic data processing system that can be used to carry out the systems and methods of this disclosure. For example, the data processing system 38 may include one or more processors 40, which may execute instructions stored in memory 42 and/or storage 44. The memory 42 and/or the storage 44 of the data processing system 38 may be any suitable article of manufacture that can store the instructions. In certain embodiments, the one or more processors 40 may include a microprocessor, a microcontroller, a processor module or subsystem, a programmable integrated circuit, a programmable gate array, a digital signal processor (DSP), or another control or computing device. In certain embodiments, the one or more processors 40 may include machine learning (ML) and/or artificial intelligence (AI) based processors able to implement a trained ML model.

In certain embodiments, the memory 42 and storage 44 is implemented as one or more non-transitory computer-readable or machine-readable storage media. In certain embodiments, the memory 42 may include one or more different forms of memory, including semiconductor memory devices such as dynamic or static random access memories (DRAMs or SRAMs), erasable and programmable read-only memories (EPROMs), electrically erasable and programmable read-only memories (EEPROMs) and flash memories. The storage 44 may include solid state drives, magnetic disks such as fixed, floppy and removable disks; other magnetic media including tape; optical media such as compact disks (CDs) or digital video disks (DVDs); or other types of storage devices. Note that the computer-executable instructions and associated data of the analysis module(s) may be provided on one computer-readable or machine-readable storage medium of the memory 42 or the storage 44, or alternatively, may be provided on multiple computer-readable or machine-readable storage media distributed in a large system having possibly plural nodes. Such computer-readable or machine-readable storage medium or media are considered to be part of an article (or article of manufacture), which may refer to any manufactured single component or multiple components. In certain embodiments, the storage 44 may be located either in the machine running the machine-readable instructions or may be located at a remote site from which machine-readable instructions may be downloaded over a network for execution.

As illustrated, the data processing system 38 may optionally also include a display 46, which may be any suitable electronic display and which may display images generated by the processor 40. The data processing system 38 may be a local component of the drilling system 10 (i.e., at the surface), within the one or more logging tools 32 (i.e., downhole), a device located proximate to the drilling operation, and/or a remote data processing device located away from the drilling system 10 to process downhole measurements in real time or sometime after the data has been collected. In some embodiments, the data processing system 38 may be a portable computing device (e.g., tablet, smart phone, or laptop) or a server remote from the drilling system 10. In some embodiments, the one or more logging tools 32 may store and process collected data in the BHA 28 or send the data to the surface for processing via communications 36 described above, including any suitable telemetry (e.g., electrical signals pulsed through the geological region 14 or mud pulse telemetry using the drilling fluid).

It should be noted that, although the discussion above relates to a drilling system, other downhole equipment or systems may employ the systems and methods of this disclosure. For example, a downhole tool with an acoustic tool conveyed by slickline, coiled tubing, wireline, or other delivery systems, may utilize the disclosed systems and methods.

Figure 2:
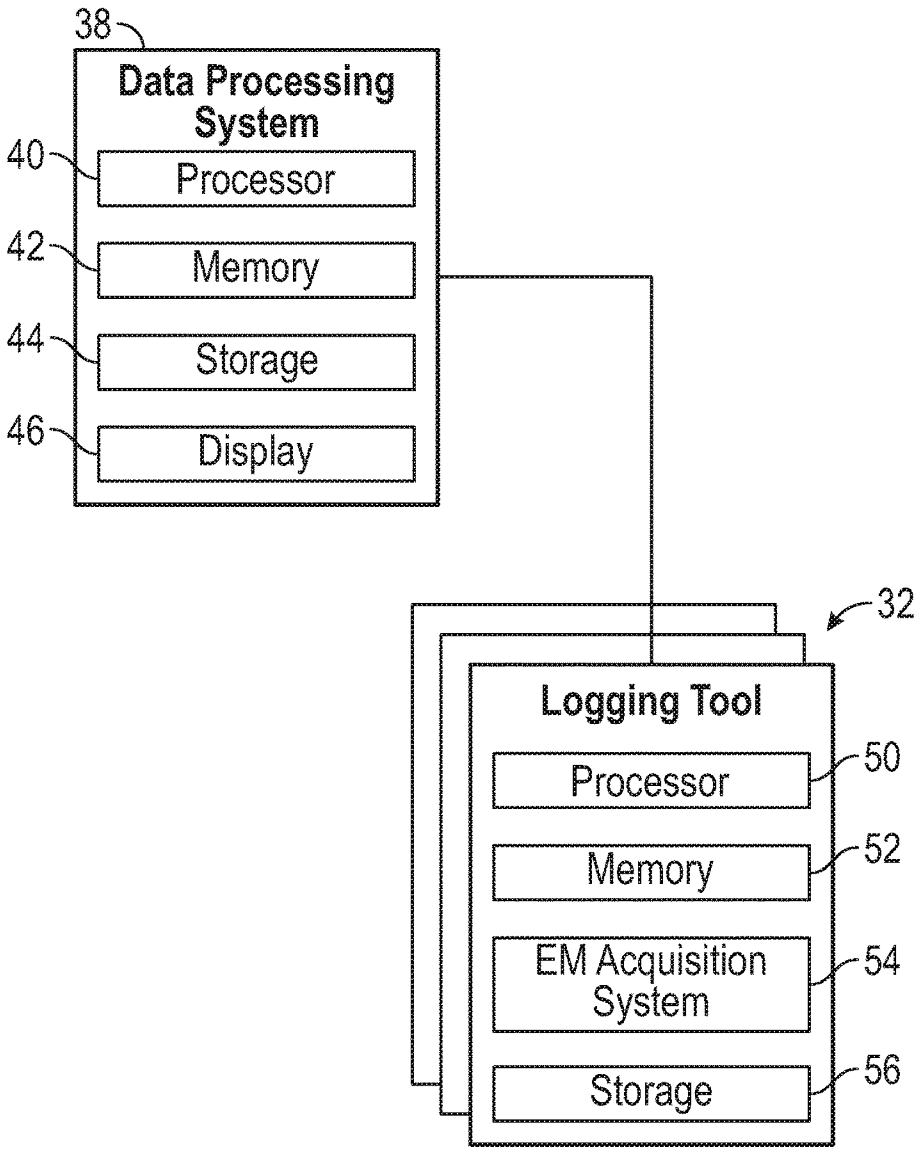
FIG. 2 depicts a well control system configured to control the wellsite system of FIG. 1, in accordance with embodiments of the present disclosure.

Operation of drilling system 10 may be controlled by a processor of the data processing system 38. For example, FIG. 2 illustrates a block diagram of the data processing system 38 that is communicatively coupled to the one or more logging tools 32. In the illustrated embodiment, a logging tool 32 includes a processor 50, memory 52, an electromagnetic (EM) acquisition system 54, and storage 56. In some embodiments, the processor 50 may be ASIC (application specific integrated circuit), field programmable gate array (FPGA), a micro control unit (MCU), a digital signal processor (DSP), and the like. In general, the drilling system 10 communicates with the data processing system 38 via a data cable, telemeter or other suitable techniques. For example, the drilling system 10 may communicate EM measurements obtained by an EM sensor (or meter) as part of the EM acquisition system 54. In turn, a processor of the surface control system may determine certain parameters (e.g., porosity, water saturation, permeability, velocities, resistivity, and so forth) based on the EM measurements. In such embodiments, the EM acquisition system 54 may include an emission source (e.g., an antenna) to acquire, obtain, or otherwise measure EM measurements.

In certain embodiments, the data processing system 38 may include one or more analysis modules (e.g., a program of computer-executable instructions and associated data) that may be configured to perform various functions of the embodiments described herein. In certain embodiments, to perform these various functions, the one or more analysis modules may be executed on one or more processors 40 of the processing system 38, which may be connected to memory 42 and storage 44 in which the one or more analysis modules may be stored.

In certain embodiments, the computer-executable instructions of the one or more analysis modules, when executed by the one or more processors 40, may cause the one or more processors 40 to generate one or more models (e.g., forward model, inverse model, mechanical model, and so forth). Such models may be used by the processing system 38 to predict values of operational parameters that may or may not be measured (e.g., using gauges, sensors, and so forth) during well operations.

Figure 3:
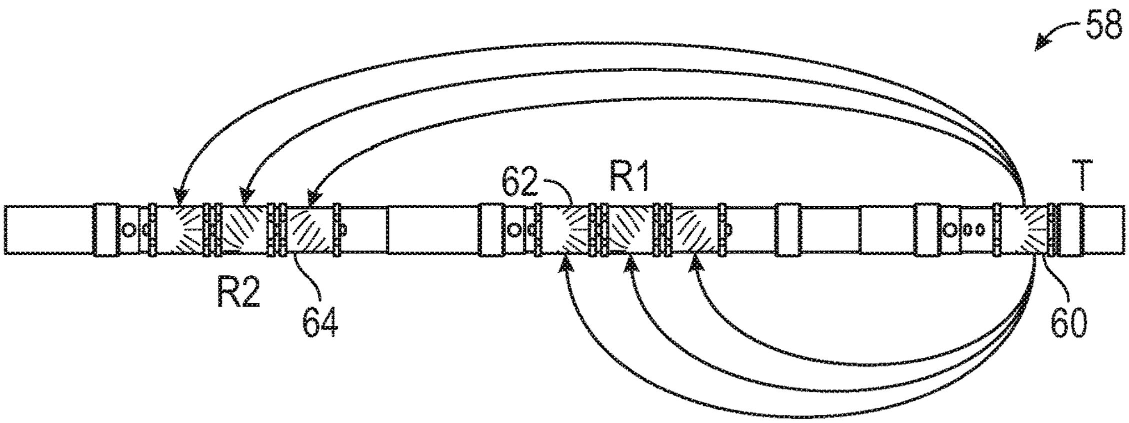
FIG. 3 depicts an example of an electromagnetic logging tool as the logging tool of FIG. 1, in accordance with embodiments of the present disclosure.

FIG. 3 illustrates an example of an electromagnetic (EM) logging tool 58 that can be utilized as one of the one or more logging tools 32. The EM logging tool 58 (e.g., EM tool 58), as illustrated, includes one or more coils (e.g., co-axial coils) as a transmitter 60 as well as receiver 62 and receiver 64 disposed along the EM tool 58. One or both of the receiver 62 and the receiver 64 can include tilted and/or transverse and/or axial coils (e.g., antenna). This results in mapping-while-drilling or LWD services that provide rapid and high delineation of reservoir layers and formation evaluation while drilling. In some embodiments, this can allow for geosteering operations to be performed whereby directional control of a well is determined based on, for example, the results of the geological logging measurements by the EM logging tool 58.

Figure 4:
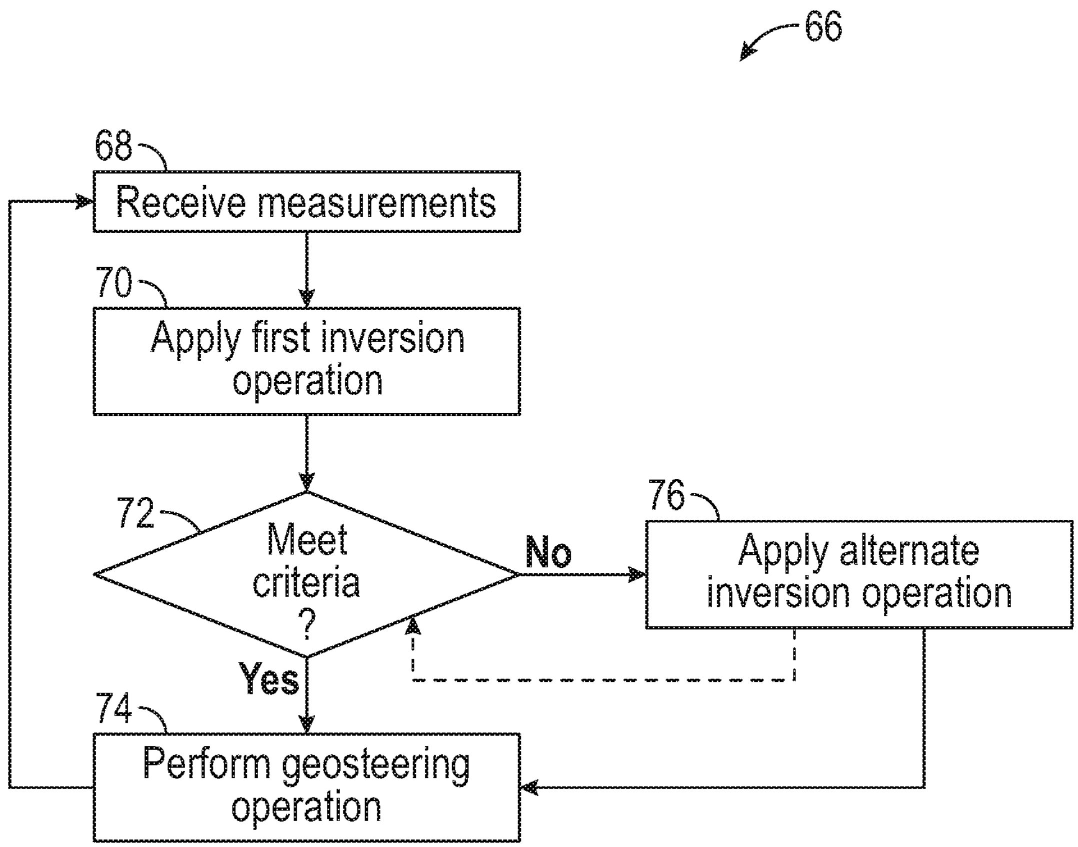
FIG. 4 depicts a flow chart describing a technique to implement merging of inversion techniques in accordance with a geosteering operation involving the logging tool of FIG. 1.

During operation, downhole measurements made by the EM tool 58 produce a large amount of measurement data (e.g., measurement logs). As previously discussed, one technique utilized to interpret the measured data involves implementation of an inversion process to generate (i.e., determining) reservoir characteristics that are utilized in the geosteering process. In some embodiments, the inversion process that is applied can be a traditional inversion method or technique (e.g., utilizing a Gauss-Newton method or the like). In other embodiments, a trained ML model can be implemented to perform the inversion process. In still other embodiments, a first inversion process (e.g., utilizing a trained ML model) can be implemented to perform the inversion and a second inversion process (e.g., a traditional inversion) be applied to measured data to implement a geosteering operation when the results of the first inversion process are found not to meet or exceed a desired (or predetermined) level of accuracy. FIG. 4 illustrates an example of a technique for implementation of this embodiment.

FIG. 4 depicts a flow chart 66 describing a technique to implement a geosteering operation using one or more inversion techniques on measured data. It should be noted that at least some of the blocks of flow chart 66 can be implemented and/or performed by the data processing system 38 and/or the logging tool 32, although the method of flow chart 66 (as well as the techniques previously discussed) may be performed by any suitable computing system, computing device, and/or the like. In this way, it should also be understood that some or all of the below described processing operations may be performed by one or more components of the data processing system 38, including the processor 40, the memory 42, storage 44, or the like, and may be executed by the processor 106, for example, executing code, instructions, commands, or the like stored in the memory 108 and/or the storage 110 (e.g., a tangible, non-transitory, computer-readable medium).

In block 68, measurements made by the EM logging tool 58 are received for processing. However, in other embodiments, other logging tools can instead be utilized to generate measurements (e.g., sonic, nuclear, etc.) that are received in block 68. In some embodiments, the measurements may be received (or accessed) in block 68 via the processor 50 in the EM tool 58 (or, for example, in a respective processor 50 of the one or more logging tools 32 making the measurement). In this embodiment, the data will be operated on internally in the EM tool 58 (or the respective one of the one or more logging tools 32). In other embodiments, the measurements from the measurements made by the EM logging tool 58 are received for processing at the processor 40 of the data processing system 38. It should be noted that one or more of the blocks of flow chart 66 may be performed by the processing system 38 (e.g., via the one or more processors 40 executing code stored in the one or more of the memory 42 or the storage 44). Additionally, one or more of the blocks of flow chart 66 can be performed by the processor 50 in conjunction with the memory 52 or storage 56. Furthermore, the blocks of flow chart 66 need not be performed in the illustrated order and one or more of the blocks may be selectively omitted.

Thus, in block 68 of FIG. 4, input values (which may be transmitted from storage) may be transmitted to (or received by), for example, the one or more processors 40 of the data processing system 38 (or the processor 50 of the one or more logging tools 32). The input values can include formation characteristics and/or parameters to be solved in conjunction with the LWD or mapping-while-drilling operation. The input values can also include, for example, well trajectory information (i.e., depths, angles, and/or other characteristics of the well being drilled). The input values can also include, for example, a tool channel list that represents all of the channels for measurement logs that can be transmitted by the EM tool 58.

In block 70, an inversion is performed on the data received in block 68. In some embodiments, this inversion in block 70 is an inversion operation performed by or otherwise utilizing a trained ML model. The inversion process in block 70 can be, for example, a 1D inversion, a 2D inversion, or a 3D inversion operation. As noted above, in some embodiments, this inversion process on the data received from block 68 can be performed by processor 50 executing code stored on memory 52. In block 72, the results of the inversion operation in block 70 can be compared against a confidence criterion (or quality criterion). In this manner, the results of the inversion operation utilizing the trained ML model are compared against a predetermined criteria (e.g., a predetermined threshold value). For example, this threshold may be a measure of the confidence in the accuracy of the result of the inversion process in block 70.

In some embodiments, the confidence criterion (or quality criterion) can be one or more of a standard normal or chi-squared distribution of data misfit above a threshold for a certain span. That is, the confidence criterion (or quality criterion) can be an inversion data misfit whereby, for example, a distribution of the data generated via the inversion process in block 70 deemed not to meet a predetermined criteria, for example, exceeding a predetermined particular threshold. In some embodiments, this process in block 72 can be based on an instantaneous above-threshold value. In other embodiments, the process in block 72 can be based on an averaging (or filtered) of multiple above-threshold values for the data generated via the inversion process in block 70. Thus, the data misfit test in block 72 can be a measure of how well the inversion model of block 70 fits the observed data of block 68. If the misfit is large (i.e., above a threshold value), it indicates that the model (i.e., the trained ML model) may not be accurately representing the subsurface properties when performing the inversion process in block 70.

Additionally and/or alternatively to using data misfit as the threshold value in block 72, the confidence criterion (or quality criterion) in block 72 can be related to machine learning uncertainty. That is, the test in block 72 can be based on one or more uncertainty metrics of the machine learning inversion itself. For example, this can be based on high uncertainty of a single Monte Carlo Dropout (or a similar) model. Monte Carlo Dropout (MCD) is an example of a technique used in neural networks to estimate the uncertainty in predictions. It involves adding dropout layers to the neural network, which randomly deactivates a subset of neurons during each forward pass, both during training and testing. This randomness helps prevent overfitting during training and allows the network to generate a distribution of different outputs during testing, from which uncertainty can be measured.

For instance, in the context of machine learning inversion via a trained ML model, MCD can be used to assess the uncertainty of predictions. By running the prediction multiple times with different dropout masks, a distribution of outputs is obtained, which provides a measure of uncertainty. This is particularly useful when integrating machine learning methods with traditional workflows, as it can serve as a trigger to decide whether a traditional inversion is needed based on the level of uncertainty indicated by MCD.

Another technique for machine learning uncertainty can be a determination of whether there is a high discrepancy between any of several ML models that are executed (e.g., when an ensemble of ML models are utilized in block 70 as deep ensembles). Deep ensembles are a technique used in machine learning to improve predictive performance and uncertainty estimation. They involve using multiple models, which are trained on the same data but with randomized initial weights, to make predictions. The individual predictions from each model in the ensemble are then combined for analysis. This approach can be more computationally effective compared to other methods like Markov Chain Monte Carlo (MCMC) and Bayesian Neural Networks (BNN), and it is particularly useful for producing model uncertainty estimates when dealing with out-of-distribution data. In this manner, separate from or in addition to a data misfit analysis of the inversion data from block 70, machine learning uncertainty can be used as the criteria to decide in block 72 whether inversion results from the trained ML model in block 70 meet a predetermined criteria (or threshold).

As described above, block 72 may represent a triggering event. For example, when the result of the inversion process of block 70 is determined to meet a predetermined criteria, a geosteering operation in block 74 is undertaken using the results of the inversion process in block 70. This geosteering operation in block 74 can include a determination of directional control of a well as being determined based on, for example, the results of the inversion operation in block 70. In some embodiments, the geosteering operation in block 74 can include the generation of and transmission of control signals to control the directionality of, for example a drill or other drilling equipment to facilitate creation of the well along the directionality determined as part of the geosteering operation in block 74.

Additionally, when, in block 72, the result of the inversion process of block 70 is determined not to meet a predetermined criteria (e.g., be below or at or below a threshold value that is set), a second inversion operation is undertaken in block 76. The inversion process in block 76 can be, for example, a 1D inversion, a 2D inversion, or a 3D inversion operation. Additionally, this second inversion operation is different than the inversion operation in block 70. In one embodiment, the second inversion operation in block 76 can be a different type of trained ML model than the ML model used in the first inversion operation. In another embodiment, the inversion operation in block 76 is a more traditional inversion method (e.g. utilizing a Gauss-Newton method or the like) that is applied to the measured data from block 68 for evaluating subsurface formation resistivity. In some embodiments, the second inversion process in block 76 is performed via processor 40 executing code stored on memory 42 or storage 44 at the surface. Likewise, in some embodiments, the trigger operation of block 72 is similarly performed via processor 40 executing code stored on memory 42 or storage 44 at the surface. However, it should be noted that both block 72 and 76 can alternately be performed via processor 50 executing code stored on memory 52 or storage 56.

The results of the inversion process performed at block 76 can be utilized in conjunction with the geosteering operation in block 74 (in place of the results from the inversion process performed at block 70). As previously noted, the geosteering operation in block 74 can include a determination of directional control of a well. Here, that determination is based on, for example, the results of the inversion operation in block 76. Additionally, in some embodiments, the geosteering operation in block 74 can include the generation of and transmission of control signals to control the directionality of, for example downhole equipment, such as a drill or other drilling equipment, to facilitate creation of the well along the directionality determined as part of the geosteering operation in block 74. In other embodiments, the second inversion operation in block 76 (e.g., which can utilize a different type of trained ML model than that used in block 70) can be checked in block 72 and used in block 74 if it meets a predetermined criteria and a third inversion operation (e.g., which can utilize a traditional inversion method) can used in block 74.

In this manner, the technique represented in flow chart 66 allows for a first inversion process to be utilized (e.g., a light-weight machine learning method) until it is found not to meet confidence criterion or quality criterion. When it is determined that the first inversion process is producing a less than desired result, the technique illustrated in flow chart 66 allows for transition to a traditional inversion process (i.e., utilizing more computational resources and/or time, but generally providing more accurate results) can occur. In this manner, benefits of each inversion process can be utilized to enhance the geosteering operation (and/or additional downhole operations, for example, such as wireline).

The subject matter described in detail above may be defined by one or more clauses, as set forth below.

A method includes receiving at least one drilling parameter corresponding to an attribute related to a well in a formation as measured data, performing a first inversion operation utilizing the measured data to generate a first inversion result, determining whether the first inversion result meets a predetermined criteria related to quality of the first inversion result, and performing a geosteering operation based on the first inversion result when the first inversion result is determined to meet the a predetermined criteria.

The method of the preceding clause, further comprising performing a second inversion operation utilizing the measured data to generate a second inversion result when the first inversion result is determined not to meet the predetermined criteria.

The method of any of the preceding clauses, further comprising performing the geosteering operation based on the second inversion result when the first inversion result is determined to determined not to meet the predetermined criteria.

The method of any of the preceding clauses, further comprising performing the first inversion operation utilizing a machine learning model.

The method of any of the preceding clauses, further comprising performing the second inversion operation utilizing a Gauss-Newton method or a machine learning model.

The method of any of the preceding clauses, further comprising performing the first inversion operation in a logging tool disposed in the well.

The method of any of the preceding clauses, further comprising performing the second inversion operation in a data processing system at a surface above the formation.

The method of any of the preceding clauses, wherein performing the geosteering operation comprises transmitting at least one control signal to downhole equipment to control directionality of the well.

A tangible and non-transitory machine readable medium includes instructions to cause a processor to receive at least one drilling parameter corresponding to an attribute related to a well in a formation as measured data, perform a first inversion operation utilizing the measured data to generate a first inversion result, determine whether the first inversion result meets a predetermined criteria related to quality of the first inversion result, and generate at least one control signal utilized to perform a geosteering operation based on the first inversion result when the first inversion result is determined to meet the predetermined criteria.

The tangible and non-transitory machine readable medium of the preceding clause, wherein the instructions further cause the processor to perform a second inversion operation utilizing the measured data to generate a second inversion result when the first inversion result is determined not to meet the predetermined criteria.

The tangible and non-transitory machine readable medium of any of the preceding clauses, wherein the instructions further cause the processor to generate the at least one control signal utilized to perform the geosteering operation based on the second inversion result when the first inversion result is determined not to meet the predetermined criteria.

The tangible and non-transitory machine readable medium of any of the preceding clauses, wherein the instructions further cause the processor to perform the first inversion operation utilizing a machine learning model.

The tangible and non-transitory machine readable medium of any of the preceding clauses, wherein the instructions further cause the processor to perform the second inversion operation utilizing a Gauss-Newton method or a machine learning model.

The tangible and non-transitory machine readable medium of any of the preceding clauses, wherein the instructions further cause the processor to transmit at least one control signal to downhole equipment to control directionality of the well.

A system, including an acquisition system configured to measure at least one drilling parameter corresponding to an attribute related to a well in a formation as measured data and a processor coupled to the acquisition system, wherein the processor is configured to perform a first inversion operation utilizing the measured data to generate a first inversion result, determine whether the first inversion result meets a predetermined criteria related to quality of the first inversion result, and generate at least one control signal utilized to perform a geosteering operation based on the first inversion result when the first inversion result is determined to meet the predetermined criteria.

The system of the preceding clause, wherein the processor is configured to perform a second inversion operation utilizing the measured data to generate a second inversion result when the first inversion result is determined not to meet the predetermined criteria.

The system of any of the preceding clauses, wherein the processor is configured to generate the at least one control signal utilized to perform the geosteering operation based on the second inversion result when the first inversion result is determined not to meet the predetermined criteria.

The system of any of the preceding clauses, wherein the processor is configured to perform the first inversion operation utilizing a machine learning model.

The system of any of the preceding clauses, wherein the processor is configured to perform the second inversion operation utilizing a Gauss-Newton method or a machine learning model.

The system of any of the preceding clauses, wherein the processor comprises a first processor disposed in a logging tool disposed in the well to perform the first inversion operation and a second processor disposed in a data processing system at a surface above the formation to perform the second inversion operation.

This written description uses examples to disclose the subject matter, including the best mode, and also to enable any person skilled in the art to practice the subject matter, including making and using any devices or systems and performing any incorporated methods. The patentable scope of the subject matter is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The techniques presented and claimed herein are referenced and applied to material objects and concrete examples of a practical nature that demonstrably improve the present technical field and, as such, are not abstract, intangible, or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A method comprising:

receiving at least one drilling parameter corresponding to an attribute related to a well in a formation as measured data;

performing a first inversion operation utilizing the measured data to generate a first inversion result, wherein the first inversion operation is a first type of inversion operation performed downhole utilizing a first amount of computational resources;

determining whether the first inversion result meets a predetermined criteria related to quality of the first inversion result;

performing a first geosteering operation based on the first inversion result in response to determining that the first inversion result meets the predetermined criteria;

performing a second inversion operation utilizing the measured data to generate a second inversion result subsequent to determining that the first inversion result does not meet the predetermined criteria, wherein the second inversion operation is a second type of inversion operation differing from the first type of inversion operation, wherein the second inversion operation is performed by surface equipment utilizing a second amount of computational resources that is greater than the first amount of computational resources; and performing a second geosteering operation based on the second inversion result in response to generation of the second inversion result.

2. The method of claim 1, further comprising performing the first inversion operation utilizing a machine learning model.

3. The method of claim 1, further comprising performing the second inversion operation utilizing a Gauss-Newton method or a machine learning model.

4. The method of claim 1, further comprising performing the first inversion operation in a logging tool disposed in the well.

5. The method of claim 1, further comprising performing the second inversion operation in a data processing system at a surface above the formation.

6. The method of claim 1, wherein performing the first geosteering operation comprises transmitting at least one control signal to downhole equipment to control directionality of the well.

7. A tangible and non-transitory machine readable medium comprising instructions to cause at least one processor to:

receive at least one drilling parameter corresponding to an attribute related to a well in a formation as measured data;

perform a first inversion operation utilizing the measured data to generate a first inversion result, wherein the first inversion operation is a first type of inversion operation performed downhole utilizing a first amount of computational resources;

determine whether the first inversion result meets a predetermined criteria related to quality of the first inversion result, wherein the predetermined criteria comprises a data misfit corresponding to a measure of fit between the first inversion result and the measured data or wherein the predetermined criteria comprises a machine learning uncertainty measurement;

generate at least one first control signal utilized to perform a first geosteering operation based on the first inversion result in response to determining that the first inversion result meets the predetermined criteria;

perform a second inversion operation utilizing the measured data to generate a second inversion result subsequent to determining that the first inversion result does not meet the predetermined criteria, wherein the second inversion operation is a second type of inversion operation differing from the first type of inversion operation, wherein the second inversion operation is performed by surface equipment utilizing a second amount of computational resources that is greater than the first amount of computational resources; and generate at least one second control signal utilized to perform a second geosteering operation based on the second inversion result in response to generation of the second inversion result.

8. The tangible and non-transitory machine readable medium of claim 7, wherein the instructions further cause the at least one processor to perform the first inversion operation utilizing a machine learning model.

9. The tangible and non-transitory machine readable medium of claim 7, wherein the instructions further cause the at least one processor to perform the second inversion operation utilizing a Gauss-Newton method or a machine learning model.

10. The tangible and non-transitory machine readable medium of claim 7, wherein the instructions further cause the at least one processor to transmit the at least one control signal to downhole equipment to control directionality of the well.

11. A system, comprising:

an acquisition system configured to measure at least one drilling parameter corresponding to an attribute related to a well in a formation as measured data;

memory comprising executable instructions; and at least one processor coupled to the acquisition system and the memory, wherein the at least one processor is configured to execute the executable instructions to:

perform a first inversion operation utilizing the measured data to generate a first inversion result, wherein the first inversion operation is a first type of inversion operation performed downhole utilizing a first amount of computational resources;

determine whether the first inversion result meets a predetermined criteria related to quality of the first inversion result, wherein the predetermined criteria comprises a data misfit corresponding to a measure of fit between the first inversion result and the measured data or wherein the predetermined criteria comprises a machine learning uncertainty measurement;

generate at least one first control signal utilized to perform a first geosteering operation based on the first inversion result in response to determining that the first inversion result meets the predetermined criteria, wherein the at least one first control signal controls a directionality of a drill or other drilling equipment to facilitate creation of the well along a first directionality;

perform a second inversion operation utilizing the measured data to generate a second inversion result subsequent to determining that the first inversion result does not meet the predetermined criteria, wherein the second inversion operation is a second type of inversion operation differing from the first type of inversion operation, wherein the second inversion operation is performed by surface equipment utilizing a second amount of computational resources that is greater than the first amount of computational resources; and generate at least one second control signal utilized to perform a second geosteering operation based on the second inversion result in response to generation of the second inversion result.

12. The system of claim 11, wherein the at least one processor is configured to execute the executable instructions to perform the first inversion operation utilizing a machine learning model.

13. The system of claim 11, wherein the at least one processor is configured to execute the executable instructions to perform the second inversion operation utilizing a Gauss-Newton method or a machine learning model.

14. The system of claim 11, wherein the at least one processor comprises a first processor disposed in a logging tool disposed in the well to execute the executable instructions to perform the first inversion operation and a second processor disposed in a data processing system at a surface above the formation to execute the executable instructions to perform the second inversion operation.

* * * * *